Oct. 16, 1945.　　　G. E. LUNDBERG ET AL　　　2,387,080
AIR CLEANER AND BAFFLE ELEMENT THEREFOR
Filed June 5, 1943
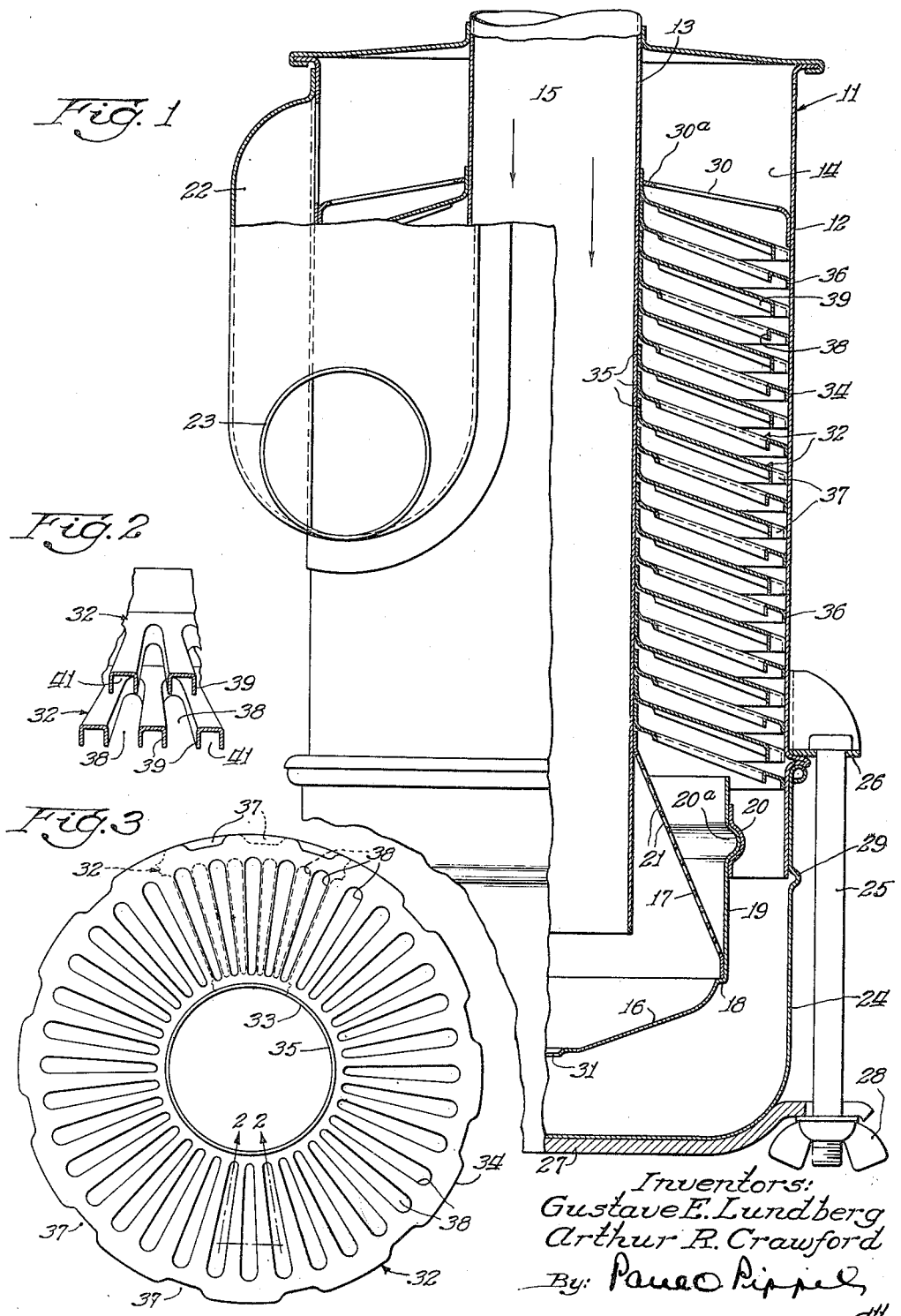
Inventors:
Gustave E. Lundberg
Arthur R. Crawford Patented Oct. 16, 1945

2,387,080

UNITED STATES PATENT OFFICE 2,387,080

AIR CLEANER AND BAFFLE ELEMENT THEREFOR

Gustave E. Lundberg and Arthur R. Crawford, Riverside, Ill., assignors to International Harvester Company, a corporation of New Jersey Application June 5, 1943, Serial No. 489,832

4 Claims. (Cl. 183—26)

This invention has to do with air cleaners of the type employing oil-wetted filter or baffle members over which unfiltered air is passed to have dirt particles extracted therefrom by the oil upon said members, and relates more particularly to an improved filter member and arrangement of a plurality of such members for collecting oil at strategic points for impingement by the air.

The invention constitutes an improvement upon an air filter of the kind shown in United States Patent No. 2,199,019, issued to David B. Baker et al. In that patent there is disclosed an air cleaner having an up-draft filter chamber in which there is a stack of slotted baffle elements having upturned flanges or lips at the edges of the slots. These lips form oil-collecting channels upon the upper sides of the baffle elements, and while the oil in such channels is brushed by the turbulated air progressing upwardly through the chamber and to thus collect dirt particles from the air, an object of the present invention is to provide a structure in which the air is impinged with greater force onto the channel-collected oil for improving the cleaning efficiency.

The aforesaid object is accomplished in the present structure by forming downwardly turned lips bordering the slots to provide the oil-collecting channels on the under sides (upstream side) of the baffle elements, and by so orienting the baffle elements about their axes that the air discharged upwardly through the slots will first strike the oil in the inverted channels on the element next above to thereby cause a greater percentage of the air to impinge the wetting oil with substantial force. A more thorough scrubbing action is thus performed on the air.

A further object is the provision of an improved air cleaner arrangement embodying baffle members having the aforesaid improved feature together with drainage means cooperable with a casing wall for returning dirt-laden oil from the baffle elements to a sump or basin from which replenishing oil is swept onto the baffle elements.

These and other desirable objects encompassed by and inherent in the invention will be better understood from the appended claims and the ensuing description which refers to the annexed sheet of drawings, wherein:

Fig. 1 is a side elevational view of an air cleaner device embodying the principles of the present invention, having side wall portions broken away to show the interior of the device, and having parts shown in section for clarity;

Fig. 2 is a fragmentary sectional view taken on the line 2—2 of Fig. 3 for illustrating the circumferential orientation of adjacent baffle elements employed in the device; and Fig. 3 is a plan view of one of the baffle elements of the device together with a fragmentary portion, shown dotted, of one of the baffle elements therebeneath, supplementing Fig. 2 illustrating the orientation of adjacent baffle elements.

Referring now to the drawing, the air cleaner device chosen for illustrating the invention comprises a sheet-metal casing 11 having an outer casing wall 12 arranged concentrically with an inner casing wall 13 to form an annular filter chamber 14 between these walls. The inner wall 13 constitutes an air intake tube 15 through which air is drawn downwardly as indicated by the arrow therein. The device is especially adapted for use as an accessory upon an internal combustion engine where it is utilized for filtering the combustion air prior to being introduced into the engine and ordinarily prior to the air being drawn into the carburetor. Air drawn downwardly through the air intake tube 15 strikes a baffle plate 16 and is deflected thereby upwardly through a perforated scrubbing plate 17. This scrubbing plate 17 is generally conical in shape, its lower edge being seated upon a circular shoulder 18 formed at the juncture of the baffle plate 16 and a vertical cylindrical extension 19 thereof. Said extension 19 constitutes an air deflecting member which serves to direct the air passing outwardly through perforations 21 in the scrubbing plate 17 upwardly through the filter chamber 14 along a course removed somewhat from the outer casing wall 12. Support for the cylindrical air deflecting wall 19 is provided by a plurality of circumferentially spaced brackets secured to the lower inner side of the casing wall 12 and having saddle sections 20, of which one is shown in Fig. 1, interlockable with outwardly deflected bosses 20ª upon the wall 19. After the air reaches the upper part of the filter chamber 14, it is conducted outwardly of the casing through an exhaust compartment 22 and an exhaust port 23 thereof. Duct means (not shown) will be employed for connecting the port communicatively with the engine carburetor.

At the beginning of the operation of the device, an oil cup or basin 24, telescoped onto the lower edge of the casing wall 12 where it is detachably held by means of a plurality of bolts 25 (one being shown in Fig. 1) secured between exterior casing wall brackets 26 and a basin supporting member 27 by means of wing nuts 28, is filled with oil to a level coinciding with a gauge bead 29 circumscribing the basin wall. Because of an aperture 31 in the center of the baffle plate 16, the oil also rises to the level of the gauge bead 29 interiorly of the cylindrical wall 19. The air passing downwardly through the intake tube 15 entrains with it part of the oil within the cylindrical deflector wall 19 and above the deflector plate 16, carrying the same upwardly into the filter chamber 14 and depositing the same onto the individual baffle elements of a series of such elements 32 spaced apart vertically. Oil thus deposited on the baffle elements 32 serves to wet them, which has an effect tantamount to increasing their affinity for the dirt particles within the air. These baffle elements 32, while being constructed to allow the passage of air upwardly through the filter chamber, as will be described presently, are also constructed for cooperating with the casing wall 12 for draining part of the wetting oil downwardly into the basin 24, thereby causing recirculation of the oil, the dirt laden oil drained from the elements 32 settling out in that part of the basin 24 below the baffle plate 16 and the oil from which the dirt has settled being reintroduced onto the upper side of the baffle plate through the opening 31, where it is reentrained by the incoming air and carried thereby upwardly through the scrubbing plate 17 for redeposit on the baffle elements 32. Openings 30 within an annular plate 30ª above the series of plates 32 adapt this plate 30ª to permit the passage of air into the upper part of the filter chamber.

That part of the device thus far described corresponds to and functions essentially like the cleaner device shown in the aforesaid Patent No. 2,199,019. The novelty of the present device resides in the shape and arrangement of the baffle elements 32. Said baffle elements are identically constructed. Each is formed as a stamping from sheet metal into a thin annular body sloping radially downwardly and outwardly from an inner peripheral edge 33 to an outer peripheral edge 34. An upturned flange 35 is formed at the inner periphery 33 of each member 32, whereas a downwardly turned flange 36 is formed at the outer periphery 34. Notches 37, Figs. 1 and 3, are also formed in the outer periphery of these members. Each baffle member 32 has a plurality of radially extending slots 38 bordered by downwardly turned flanges or lips 39, which are constructed of the material displaced in effecting said slots. It can be readily ascertained from Fig. 2 that the lips 39 in bordering adjacent slots 38 form radial channels 41.

In assembling the device, the annular baffle elements 32 are slid into place onto the air inlet tube 15, and as each is slid into place it is secured to the air inlet tube by welding or soldering its inner peripheral flange 35 to the tube. Said baffle elements are progressively added to the tube 15, the lowermost element being first placed upon and secured to the tube, and as the other elements are successively added each is oriented with respect to the preceding element so that the channels 41 in each added element register axially of the device with the slots 38 in the baffle element next below. This orientation of the baffle elements circumferentially of the device is also effected in such a manner as to stagger the outer peripheral notches 37, whereby the notches in each member will respectively register with the material between the notches in the elements next above and next below. Staggering of the peripheral notches 37 impedes the up-draft of the air therethrough so that the dirt-laden wetting oil may flow with greater facility downwardly through circuitous paths cooperatively formed by these notches and the outer side wall 12. Up-draft of the air through notches 37 is also minimized by the cylindrical air deflecting membe. 19, which serves to deflect the main part of the up-draft away from the outer casing wall.

Turning the lips of flanges 39 downwardly at the borders of the openings 38 in the baffle member and thus forming the inverted channels 41 upon the under sides of the baffle members increases the amount of wetting oil collected upon the under sides of the baffle members, and further, since there is a tendency for this oil to collect within said channels, the orientation of the elements so that the openings 38 are immediately below the channels causes the air to be impinged through said openings directly onto the concentrations of collected wetting oil. The present device, therefore, by employing a principle utilizing the surface tensioned properties of the oil for causing it to follow within the inverted channels upon the baffle elements, embodies a novel operating principle which results in a device capable of more thoroughly filtering air.

While we have herein shown and described a preferred embodiment with the view of illustrating the invention, it should be understood that the invention extends to other forms, arrangements, structures, and details falling within the scope and spirit thereof and not sacrificing all of its material advantages.

What is claimed is:

1. An air filter of the oil bath type comprising a casing in which there is an annular up-draft chamber having opposed inner and outer walls, and filter means comprising a series of conical baffle members spaced axially in said chamber with their concave faces disposed downwardly, each of said members having an opening of which the edge engages the inner casing wall, a notched outer edge engaging the outer casing wall and radial air-passing slots bordered by downwardly turned lips to form inverted troughs between the lips of adjacent slots, and said members being circumferentially oriented so the notches in their outer edges are disalined axially of the casing with the slots of the filter members adjacent thereto.

2. In an air filter of the oil bath type, a casing in which there is an up-draft chamber having opposed inner and outer walls, an oil catch basin communicating upwardly into said chamber and duct means for directing unfiltered air over oil in said basin to sweep the same upwardly into said chamber, and filter means wettable by the upwardly swept oil to collect dirt from said air, comprising a series of conical baffle members spaced axially in said chamber and arranged with their inner and outer edge peripheries respectively upon said inner and outer chamber walls, each of said baffle members having radial air-passing slots bordered by downwardly turned lips to form inverted troughs between the lips of adjacent slots, and said baffle members being circumferentially oriented so the slots of each register, axially of the chamber, with the troughs of the member next above to impinge the air onto the oil in such troughs.

3. The combination set forth in claim 2, wherein at least one of the edge peripheries of said baffle members contains notches so oriented circumferentially of the chamber that the notches on each are disalined axially of the chamber with those on the next adjacent members to form, with the associated chamber wall, tortuous passages for directing excess wetting oil back to the basin.

4. An oil-wetted air filter baffle member utilizable in an air filter of the oil bath type, including a thin frusto-conical body having an outer rim, a central opening, radial slots reaching substantially between said opening and rim, channel-forming lips along the edges of said slots and drainage passages at said rim, the sides of said body sloping continuously from the opening to said rim, and said lips being turned to project into the cavity from the inner surface of said body.

GUSTAVE E. LUNDBERG.
ARTHUR R. CRAWFORD.